United States Patent
Likitalo et al.

(10) Patent No.: US 6,855,819 B2
(45) Date of Patent: Feb. 15, 2005

(54) METHOD FOR MANUFACTURING HIGH-CATIONIC STARCH SOLUTIONS

(75) Inventors: Antti Likitalo, Turku (FI); Jouko Käki, Turku (FI)

(73) Assignee: Ciba Specialty Chemicals Corporation, Tarryton, NY (US)

( * ) Notice: Subject to any disclaimer, the term of this patent is extended or adjusted under 35 U.S.C. 154(b) by 0 days.

(21) Appl. No.: 10/636,771

(22) Filed: Aug. 8, 2003

(65) Prior Publication Data

US 2004/0030119 A1 Feb. 12, 2004

Related U.S. Application Data

(63) Continuation of application No. 09/728,078, filed on Dec. 4, 2000, now abandoned, which is a continuation of application No. PCT/FI99/00482, filed on Jun. 3, 1999.

(30) Foreign Application Priority Data

Jun. 3, 1998 (FI) .................................................. 981258

(51) Int. Cl.⁷ ............................. C07H 1/00; C08B 31/00
(52) U.S. Cl. ....................................... 536/124; 536/102
(58) Field of Search ................................. 536/124, 102

(56) References Cited

U.S. PATENT DOCUMENTS

| | | |
|---|---|---|
| 3,422,087 A | 1/1969 | Caesar et al. |
| 3,654,263 A | 4/1972 | Cescato |
| 4,146,515 A | 3/1979 | Buikema et al. |
| 4,464,528 A | 8/1984 | Tasset |

OTHER PUBLICATIONS

File WPI, Derwent Accession No. 89–050139, Showa Denko KK: "Appts. for continuous preparation of cationized starch—has tank to form slurry with starch and epoxide–contg. quat. ammonium salt, cooker to form paste by contact with steam, etc.", JP, A, 1006001, 890110, DW 8907. Abstract Only.

Primary Examiner—James O. Wilson
Assistant Examiner—Everett White
(74) Attorney, Agent, or Firm—Connolly, Boye, Lodge & Hutz LLP

(57) ABSTRACT

The invention relates to a method for producing starch solutions of high cation equivalent value (with a DS of 0.1–1.0). The starch to be cationized, advantageously an oxidized starch, is slurried to form a suspension of about 10–80% solids content in an aqueous mixture of a cationizing agent. In the cationization 2,3-epoxypropyltrimethylammonium chloride or an equivalent chlorohydrin-functional cationizing agent is used by about 90–1100 g per kg starch solids, and a catalyst is added to the slurry. The reaction is carried out at a high solids content of 40–80%, preferably 50–60%, in at least two successive steps, in the first of which a temperature of about 5–40° C. is maintained, and in the second step a temperature of about 70–180° C.

12 Claims, 1 Drawing Sheet

METHOD FOR MANUFACTURING HIGH-CATIONIC STARCH SOLUTIONS

CROSS REFERENCE TO RELATED APPLICATION

This application is a continuation of copending U.S. pat. application Ser. No. 09/728,078, filed Dec. 4, 2000, now abandoned which was a continuation of Application No. PCT/FI99/00482, filed Jun. 3, 1999.

BACKGROUND OF THE INVENTION

A plurality of different methods have been developed for cationizing starch solutions. Cationizing agents conventionally used are tertiary or quaternary nitrogen compounds additionally including such a reactive functional group that is capable of effectively reacting with $OH^-$ groups of the starch. This kind of substituent group may be, e.g., an epoxy or a chlorohydrin group. Besides the $OH^-$ groups, oxidized starch may also have carbonyl and carboxyl acting as reacting groups.

The cationizing agent most commonly used today is 2,3-epoxypropyltrimethylammonium chloride or, alternatively, a corresponding cationizing agent with a chlorohydrin functional nature. These compounds are characterized in that they can establish an ether bond with the $OH^-$ groups of starch. Thus, they react with starch so as to form a compound which is stable over a very wide pH range. They are particularly stable especially over the basic pH range. This property is advantageous during long-term storage, since high pH gives products an increases resistance to microbiological attacks.

Based on their preparation technology, the cationizing methods can be categorized in three major groups:

1. Wet Methods

In these methods, cationization is carried out in an aqueous medium in which starch all the time can be in a slurry form, thus giving rise to an synonym term of slurry cationization. Furthermore, the starch may be partially or entirely dissolved during cationization. The latter process is called gel cationization.

2. Dry Cationization

This method is characterized in that the starch remains all the time in powdered form. The solids content may rise very high (even higher than 85%), while the degree of substitution (DS) usually stays smaller than 0.3.

3. Solvent Cationization

Herein, an organic solvent such as ethanol is used as liquid medium instead of water. Dissolution of starch in the solvent medium is generally tried to avoid, whereby it is possible to get the cationic product in powdered form. Yet, dissolution of the starch in the medium is an alternative not entirely excluded.

Most of the industrial-scale cationization processes employed today are based on the above-mentioned wet or dry starch preparation methods. Of the wet methods, methods based on slurry cationization techniques are primarily used. Cationization methods using solvents such as ethanol as a medium entail high operating costs. Their process investment costs are inflated i.e. by regeneration of solvents as well as by elevated fire risk and occupational safety factors.

Of the wet methods, slurry cationization is generally preferred when the goal is set for a relatively low degree of substitution (DS<0.1) and when the cationic starch product thus obtained is desired to be processed into slurry or powdered bulk shipping form. The gel technique is chiefly used when a high degree of substitution (DS from 0.1 to 1.0) is desired and an elevated process temperature is used. In this case, the cationic product is always in a dissolved form.

In suspension and slurry cationization, the starch is slurried in water to obtain a suspension of about 40–43% solids into which the cationizing agent is added. Simultaneously, the pH is controlled by sodium hydroxide addition to about pH 11–12, while the temperature is kept at about 40–45° C. Under these conditions, cationization occurs in about 6–16 h. The starch remains in slurry form during the entire cationization process. This technique is a leading method in the preparation of cationic internal and surface size starches having a DS value smaller than 0.1, typically less than 0.05.

A characteristic property of wet methods is that when the degree of substitution (DS) is elevated substantially higher than 0.1, the starch granules start to fragment and the cationic starch produced begins to swell and partially dissolve into water acting as the process medium. This is disadvantageous when the cationized starch is desired to be separated by filtration as a dry powder. However, in most applications a DS value smaller than 0.1 is quite sufficient.

Yet, there are applications in which the starch is required to have a substantially stronger cationic character. Such applications are for instance the use of cationic starch as a fixative, a retention agent, a flocculent, a dewatering chemical, a dispersant, a neutral size promotor or the like. Hereby a degree of substitution in the range of 0.1–1.0 or even higher is required, whereby the cationization must be carried out using the gel cationization technique. In using this method an economical maximum is considered to be a degree of substitution close to one.

By using an organic solvent the solubility of starch into the intermediary phase can be reduced substantially or even entirely prevented. By the solvent cationization method it is possible to produce starches of a considerably high cation equivalent value in which the DS value may be close to one.

The solubility of starch in cationization is essentially affected by the cationization temperature, the type and amount of catalyst used as well as the desired degree of substitution (DS). Also the degree of fragmentation affects the solubility of starch. Highly oxidized starches tend to dissolve more readily. Sodium hydroxide or lime is conventionally used as catalyst. In principle any base will do, which is able to separate a proton from the starch.

By dry cationization it is possible directly to get powdered cationic starch, but by this method it is more difficult to achieve an equally high degree of substitution than by the two other methods. In practice, already a DS value higher than 0.3 causes problems.

In the preparation of aqueous solutions of starches of very high cation equivalent value, it is even advantageous that the starch dissolves during cationization. In this way, an entire starch granule, during its gradual fracture, will be cationized entirely and, in practice even fully homogeneously. Generally, the same does not apply to dry and solvent cationization. In this context, a very high degree of cationization means a DS value of 0.1–1.0, which is equivalent to a nitrogen content of 0.8–4.5% in using the above-mentioned chemicals.

It is well known that the higher a nitrogen content, i.e. a DS value is attempted, the harder it will be to reach. This means that the higher the aimed DS value is, the lower the yield will be. The reasons thereto are on one hand related to steric factors in the starch structure and on the other hand on hydrolysis of the cationizing agent in the influence of water, sodium hydroxide and heat, a reaction competing with the cationization reaction.

In the previously known cationization methods, the yield of the cationization reaction in suspension and slurry cationization is about 70% (with a DS value of 0.05 to 0.1), and in gel cationization about 90% with a DS value smaller than 0.3 and about 75% with a DS value higher than 0.7. In dry cationization the yields are higher than in the above mentioned methods, but it is believed that the method is suitable only for obtaining a DS value smaller than 0.3. Likewise, slurry cationization is not known to be usable for a DS value higher than 0.1, principally due to filtration problems. The yield can be increased also by using a high-solids reaction environment. Decreasing the amount of water in the reaction mixture lowers the probability of the competing hydrolysis reaction. Previously this strategy has been applied to gel cationization as is described, e.g., in FI Patent No. 94135 and publication WO 95/18157.

Also continuously operating gel cationization methods (JP 7–68281 and JP 64–6001) are known, by which cationic starch solutions with a DS value smaller than 0.1 can be produced. In these methods the yields have been below 70% with a DS value smaller than 0.1.

SUMMARY OF INVENTION

Thus, with previously known methods it has not been possible to prepare a starch solution of high cation equivalent value having a DS value in the range 0.1–1.0 with a good yield. This is achieved with a method according to the present invention, in which method the starch to be cationized, preferably an oxidized starch, is slurried to form a suspension having a solids content of about 10–80% in an aqueous mixture of a cationizing agent, the cationizing agent, such as 2,3-epoxypropyltrimethylammonium chloride or an equivalent chlorohydrin-functional cationizing agent being used in an amount of about 90–1100 g per kg starch, a catalyst is added to the slurry, and the cationizing agent is reacted with the starch so that the reaction is carried out at a high solids content of 40–80%, preferably 50–60%, in at least two successive steps, in the first of which a temperature of about 5–40° C. is maintained, and in the second a temperature of about 70–180° C. The cationized starch is obtained as a solution.

High reaction solids content of 40–80%, advantageously 50–60%, during all steps of the reaction is extremely decisive. In the method according to the invention the high reaction solids content together with a three-step process makes it possible to reach a high yield more than 95% in the process (cf. FIG. 1).

Addition of the catalyst as a last step and a preliminary reaction carried out at a low temperature diminish the hydrolysis of the cationizing agent thus improving the yield. Simultaneously, the risk of base-catalyzed thermal decomposition of the cationizing agent is reduced.

DESCRIPTION OF BEST AND VARIOUS MODES FOR CARRYING OUT INVENTION

Thus, the method according to the invention is an at least two-step, advantageously a three-step process carried out in a high reaction solids content, said method comprising the steps: a cold preliminary reaction carried out at 5–40° C., a rapid elevation of the temperature to a temperature of 70–180° C. and a postreaction carried out at a temperature lower than 100° C. During all steps of the process, the reaction solids content is preferably 50 to 60%.

Figure 1:
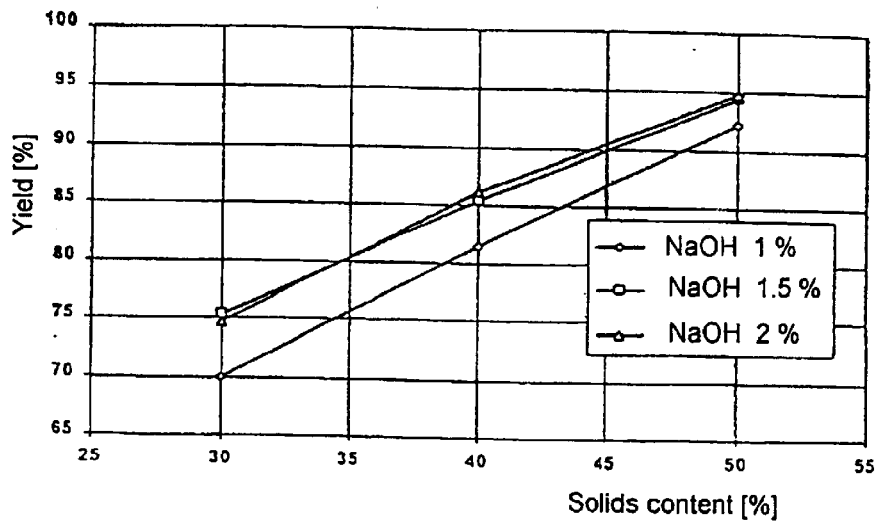
FIG. 1 is a diagram showing the yield of total reaction vs. solids content for different amounts of NaOh.
Figure 2:
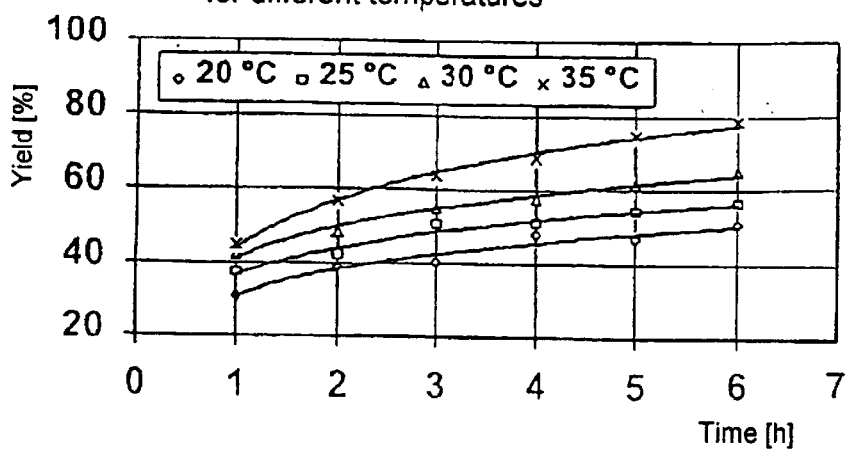
FIG. 2 is a diagram showing the yield of preliminary reaction vs. time for different temperatures.

The first step of the method is a cationization performed as a cold reaction at a relatively low temperature of 5–40° C., preferably at 15–35° C. When a DS value in the range 0.1–1.0 is desired, temperatures above 40° C. are disadvantageous, because the reaction mixture may gel prematurely during the time required for the preliminary reaction, whereby its transfer to the next process step becomes difficult or may even turn impossible. The effect of the temperature on the yield of the preliminary reaction is illustrated in FIG. 2. A substantial part of the cationization reaction, typically about 30–75%, occurs during this time as a slurry cationization. The yield of this process step is essentially affected by the amount of catalyst used and a properly adjusted reaction time, see FIGS. 1 and 2. A proper amount of catalyst is about 1–4%, preferably 2–3%, of the amount of starch. In principle, the catalyst may be any strong base capable of separating a proton from the starch in an aqueous solution. Advantageously, alkali and earth alkali hydroxides are suitable for this purpose. The reaction time in the cold reaction step is from 1 to 10 hours, preferably from 3 to 6 hours.

After the cold reaction step, the temperature of the reaction mixture is elevated rapidly to 70–180° C., preferably to 80–140° C., whereby the high end viscosity of the gelling reaction is avoided and no high-capacity agitators are needed. A short-term temperature elevation contributes to the yield of the reaction by diminishing the thermal decomposition of the cationization reagent.

The rapid temperature elevation may be performed in a reactor, a special heat exchanger using either direct or indirect steam heating. A substantial fraction, about 20–60%, of the cationization reaction takes place during the temperature elevation as a gel cationization reaction. Due to the rapid temperature elevation the reaction mixture will simultaneously be brought into a solution form.

As a last step in the process it is advantageous to use a postreaction carried out in a solution form, where the cationization reaction is completed. This step may further improve the yield of the process by about 5–10%. After this step, no epoxy residues can be found in the product. Epoxy residues are often a problem in highly dry-cationized starch products.

Accordingly, the entire process is a wet cationization method combining the benefits of slurry and gel cationization methods. With a conventional gel cationization method it is hard or even impossible to cationize large amounts of native starch to a high DS value, simultaneously attaining a good yield. The method according to the invention has no limitations in this respect, but rather, permits almost any type of starch (native starch, cross-linked starch, oxidized starches, etc.) to be processed into cationic starch solutions with almost any degree of substitution in the DS range of 0.1–1.0 and in solutions having a high solids content. In the method, the yield of the reaction varies in the range 75–95% depending on the DS target range (DS=0.1–1.0). Generally, the yield is better than 90% when the DS value is smaller than 0.4.

Depending on the conditions and required DS value, the solids content of the reaction mixture varies in the range of 40–80%, preferably 50–60%.

EXAMPLE 1

A test series was carried out using the basic formula given below. The goal was set to obtain a DS value of 0.2.

| | |
|---|---|
| Starch | 2180 g |
| Cationizing agent | 460 g |
| Water | 2300 g |
| Sodium hydroxide (50% conc.) | 33–100 g |

Starch was slurried in a mixture of water and cationizing agent (2,3-epoxypropyltrimethylammonium chloride) and sodium hydroxide was added. The amount of sodium hydroxide (1–3% of starch), the agitation temperature (20–35° C.), the cold preliminary reaction time (1–6 h) and the steam temperature (120–150° C.) were varied. The nitrogen content was assayed prior to steam heating, immediately thereafter and 2 h later. Thus, a set of measurement values was obtained from which the average value and range of variation are disclosed in

TABLE 1

| | Cationization process | | |
|---|---|---|---|
| | Preliminary reaction | Heating | Postreaction |
| Nitrogen [%] | 0.60 ± 0.17 | 1.20 ± 0.07 | 1.30 ± 0.03 |
| Yield [%] | 37 ± 11 | 80 ± 5 | 88 ± 3 |
| Progress of reaction [%] | 42 ± 13 | 91 ± 5 | 100 |
| Relative proportion in total reaction [%] | 42 ± 13 | 49 ± 6 | 9 ± 5 |

EXAMPLE 2

2270 g starch was slurried in a mixture containing 1985 ml water and 360 g of the cationizing agent mentioned in Example 1. 385 g sodium hydroxide (10% conc.) was added. The mixture was agitated for 5 h at 30° C. Subsequently, the mixture was heated with steam (120° C.). The mixture was allowed to cool down. The nitrogen content percentage of the mixture was measured prior to heating, immediately after heating and one hour after heating. The results are given in Table 2. The goal was set to obtain a DS value of 0.15.

TABLE 2

| | Cationization process | | |
|---|---|---|---|
| | Preliminary reaction | Heating | Postreaction |
| Nitrogen [%] | 0.5 | 1.0 | 1.1 |
| Yield [%] | 38 | 88 | 95 |
| Progress of reaction [%] | 40 | 93 | 100 |
| Relative proportion in total reaction [%] | 40 | 53 | 7 |

EXAMPLE 3

1060 g starch was slurried in a mixture containing 530 ml water, 610 g cationizing agent (cf. Example 1). 197 g sodium hydroxide (10% conc.) was added. The mixture was allowed to react for 5 h at 35° C. The mixture was heated with steam (140° C.) and allowed to cool down to room temperature. The nitrogen content percentage was measured in a similar manner as in the previous Examples. The results are given in Table 3. The goal was set to obtain a DS value of 0.5.

TABLE 3

| | Cationization process | | |
|---|---|---|---|
| | Preliminary reaction | Heating | Postreaction |
| Nitrogen [%] | 2.0 | 2.3 | 2.4 |
| Yield [%] | 58 | 70 | 75 |
| Progress of reaction [%] | 77 | 93 | 100 |
| Relative proportion in total reaction [%] | 77 | 16 | 7 |

EXAMPLE 4

A test series using the basic formula given below was carried out at different temperatures:

| | |
|---|---|
| Starch | 1680 g |
| Cationizing agent | 1600 g |
| Water | 1650 g |
| Sodium hydroxide (50% conc.) | 72 g |

The mixture was treated analogously with the previous examples. The progress of the cold preliminary reaction at different temperatures is listed in Table 4. The goal was set to obtain a DS value of 0.9.

TABLE 4

| Temp. Reaction time [h] | 25° C. | | | 30° C. | | | 35° C. | | |
|---|---|---|---|---|---|---|---|---|---|
| | N [%] | DS | Yield [%] | N [%] | DS | Yield [%] | N [%] | DS | Yield [%] |
| 1 | 1.3 | 0.18 | 19 | 1.3 | 0.17 | 19 | 1.4 | 0.19 | 21 |
| 2 | 1.4 | 0.19 | 21 | 1.6 | 0.22 | 24 | 1.7 | 0.25 | 27 |
| 3 | 1.5 | 0.21 | 23 | 1.8 | 0.26 | 29 | 2.0 | 0.30 | 34 |
| 4 | 1.7 | 0.24 | 27 | 2.0 | 0.30 | 33 | 2.3 | 0.35 | 39 |
| 5 | 1.7 | 0.24 | 27 | 2.2 | 0.32 | 36 | 2.5 | 0.40 | 45 |
| 6 | 1.8 | 0.26 | 29 | 2.3 | 0.35 | 39 | 2.8 | 0.45 | 51 |
| 7 | 1.9 | 0.28 | 31 | 2.4 | 0.38 | 42 | 3.0 | 0.51 | 57 |

In the test series performed at 30° C. process temperature, after heating (at 125° C.) the nitrogen content percentage was determined to be 3.6% (at 75% yield). The relative proportions of the process steps in completion of the total reaction (76%, 19%, 5%) are compliant with those given in Table 3.

EXAMPLE 5

Using the formula of Example 1, a test series was carried out varying the solids content and the amount of catalyst as a function of the yield. The goal was to obtain a constant degree of substitution (a DS value of 0.2), using a constant temperature (130° C.) of the heating steam. The results are shown in FIG. 1.

EXAMPLE 6

A test series of the cold preliminary reaction was carried out at different temperatures using the following reactant formula:

| | |
|---|---|
| Starch | 2410 g |
| Cationizing agent | 510 g |
| Water | 2000 g |
| Sodium hydroxide (50% conc.) | 82 g |

The results are given in Table 5 and FIG. 2.

TABLE 5

| Temp. Processing time [h] | 20° C. | | 25° C. | | 30° C. | | 35° C. | |
|---|---|---|---|---|---|---|---|---|
| | N [%] | Yield [%] | N [%] | Yield [%] | N [%] | Yield [%] | N [%] | Yield [%] |
| 1 | 0.55 | 31 | 0.65 | 37 | 0.74 | 42 | 0.78 | 45 |
| 2 | 0.68 | 39 | 0.74 | 42 | 0.84 | 49 | 0.97 | 57 |
| 3 | 0.71 | 40 | 0.87 | 51 | 0.94 | 55 | 1.07 | 64 |
| 4 | 0.83 | 48 | 0.88 | 51 | 0.98 | 58 | 1.14 | 68 |
| 5 | 0.82 | 47 | 0.93 | 54 | 1.04 | 62 | 1.23 | 75 |
| 6 | 0.87 | 51 | 0.96 | 56 | 1.09 | 65 | 1.29 | 79 |

After heating (at 120° C.), the nitrogen content of the 25° C. test series (for 6 h processing time) was 1.51% (with 95% yield). The relative proportions of the process steps in the total reaction were 59%, 38%, 3%.

What is claimed is:

1. A method for preparing highly cationized starch solutions having a degree of substitution (DS) of from 0.1 to 1.0, the method comprising:
providing an aqueous mixture with a solids content of 40 to 80%, said mixture comprising starch, a cationizing agent in an amount of 90 to 1100 g per kg starch solids, a catalyst and water; and
reacting said mixture in at least two successive steps, whereby —during the first step temperature is maintained in a range of 5 to 40° C., and —during the second step temperature of the reaction mixture is rapidly elevated to a temperature of 70 to 180° C. which increases the yield of the reaction and brings the reaction mixture into a solution form.

2. The method according to claim 1, wherein said first step is carried out at a temperature of about 15–35° C. and a reaction solids content of 40–80%.

3. The method according to claim 1, wherein said first step is performed for a period of about 1–10 h.

4. The method according to claim 1, wherein said first step comprises about 30–75% of the total reaction.

5. The method according to claim 1, wherein said second step is carried out at a temperature of about 80–140° C. and a reaction solids content of 40–80%.

6. The method according to claim 1, wherein a high energy intensity is used to elevate the temperature of the reaction mixture for carrying out said second step.

7. The method according to claim 1, wherein the relative proportion of the reaction progress during said second stage is 20–60%.

8. The method according to claim 1, wherein the reaction is completed at a decreasing temperature in a third step, immediately subsequent to said second step.

9. The method according to claim 8, wherein said third step is carried out in less than about 8 h.

10. The method according to claim 1, wherein said catalyst is used in an amount of about 1–4% of the amount of starch.

11. The method according to claim 1, wherein the cationizing agent is 2,3-epoxypropyltrimethylammonium chloride or an equivalent chlorohydrin-functional cationizing agent.

12. The method according to claim 1, wherein the catalyst is alkali or earth alkali metal hydroxide.

* * * * *

UNITED STATES PATENT AND TRADEMARK OFFICE
CERTIFICATE OF CORRECTION

PATENT NO.    : 6,855,819 B2
DATED         : February 15, 2005
INVENTOR(S)   : Antti Likitalo et al.

It is certified that error appears in the above-identified patent and that said Letters Patent is hereby corrected as shown below:

<u>Column 8,</u>
Like 24, "wherein the reaction" should read -- wherein the cationiztion reaction --.

Signed and Sealed this

Twenty-eighth Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,855,819 B2
DATED : February 15, 2005
INVENTOR(S) : Antti Likitalo et al.

It is certified that error appears in the above-identified patent and that said Letters Patent is hereby corrected as shown below:

Column 8,
Line 24, "wherein the reaction" should read -- wherein the cationization reaction --.

Signed and Sealed this

Thirtieth Day of August, 2005

JON W. DUDAS
*Director of the United States Patent and Trademark Office*